(12) United States Patent
Zhou et al.

(10) Patent No.: US 10,913,444 B2
(45) Date of Patent: Feb. 9, 2021

(54) POWER SYSTEM ARCHITECTURE FOR HYBRID ELECTRIC VEHICLE

(71) Applicant: Deere & Company, Moline, IL (US)

(72) Inventors: Guozhen Zhou, Shanghai (CN); Long Wu, Fargo, ND (US); Kent D. Wanner, Fargo, ND (US); Sean West, Dubuque, IA (US)

(73) Assignee: Deere & Company, Moline, IL (US)

( * ) Notice: Subject to any disclaimer, the term of this patent is extended or adjusted under 35 U.S.C. 154(b) by 255 days.

(21) Appl. No.: 16/141,583

(22) Filed: Sep. 25, 2018

(65) Prior Publication Data

US 2020/0094813 A1    Mar. 26, 2020

(51) Int. Cl.
| | |
|---|---|
| *H02P 3/00* | (2006.01) |
| *B60W 20/14* | (2016.01) |
| *B60L 53/22* | (2019.01) |
| *B60W 10/18* | (2012.01) |

(52) U.S. Cl.
CPC .............. *B60W 20/14* (2016.01); *B60L 53/22* (2019.02); *B60W 10/18* (2013.01); *B60L 2210/10* (2013.01)

(58) Field of Classification Search
CPC ................................ B60W 20/12; B60L 53/22
USPC ......................................................... 318/375
See application file for complete search history.

(56) References Cited

U.S. PATENT DOCUMENTS

| | | | |
|---|---|---|---|
| 5,939,861 A | * | 8/1999 | Joko ..................... H02J 7/0021 320/122 |
| 6,484,830 B1 | | 11/2002 | Gruenwald et al. |
| 8,474,560 B1 | | 7/2013 | Konz et al. |
| 8,528,675 B2 | | 9/2013 | Cherney et al. |
| 8,672,069 B2 | | 3/2014 | Cherney et al. |
| 2010/0096926 A1 | | 4/2010 | King et al. |
| 2011/0260661 A1 | | 10/2011 | Vilar |
| 2015/0069938 A1 | | 3/2015 | Hisano |

(Continued)

FOREIGN PATENT DOCUMENTS

| | | |
|---|---|---|
| EP | 3100898 A1 | 12/2016 |
| EP | 3628530 A1 | 4/2020 |

OTHER PUBLICATIONS

European search report issued in EP Application No. 19198919.3 dated Feb. 19, 2020 (7 pages).

*Primary Examiner* — Erick D Glass
(74) *Attorney, Agent, or Firm* — Birnks Gilson & Lione (57) ABSTRACT

An improved power system architecture for a hybrid electric vehicle includes a power control unit including a motor inverter, a generator inverter, and a DC-to-DC converter, and vehicle power management (VPM) circuitry directly connected to each of the motor inverter, generator inverter, and DC-to-DC converter. In this arrangement, communication timing is greatly reduced, thereby allowing for feedforward control of the motor inverter, generator inverter, and DC-to-DC converter. The feedforward control enables the VPM circuitry to predict current influx or draw by a motor and determine the corresponding currents to provide to or from the generator and battery prior to or simultaneously with the actual current influx or draw by the motor. This improves vehicle dynamics and responsiveness, as well as enables complete recapture of braking currents and eliminates the need for a brake chopper resistor, thereby improving overall vehicle efficiency.

20 Claims, 6 Drawing Sheets

(56) References Cited

U.S. PATENT DOCUMENTS

2019/0126759 A1\* 5/2019 Miller ................ B60L 7/18
2019/0225092 A1\* 7/2019 Li ................ H01M 10/482

\* cited by examiner

POWER SYSTEM ARCHITECTURE FOR HYBRID ELECTRIC VEHICLE

TECHNICAL FIELD

This disclosure relates to power system architectures for hybrid electric vehicles and machines.

BACKGROUND

Hybrid electric vehicles and machines include a power system architecture that may include a direct current (DC) bus, a generator, an internal combustion engine to drive the generator, one or more loads such as an electric traction motor, and one or more inverters or converters coupled to the generator and/or electric motor to convert power from DC on the DC bus to alternating current (AC) and vice versa. The generator converts mechanical energy from the engine into electric energy on the DC bus via an inverter in a generation mode. The generator can also operate in the opposite direction in a motoring mode to convert electric energy from the DC bus into mechanical energy via the inverter to assist the engine with other functions on board the vehicle (e.g., raising a bucket hydraulically). The traction motor converts electric energy from the DC bus into mechanical energy via an inverter for use in driving one or more traction elements (e.g., ground-engaging wheels) ("motoring"). Similarly, the traction motor can also operate to convert mechanical energy into electric energy on the DC bus via the inverter ("electric braking").

The DC bus voltage is subject to large transients introduced by vehicle braking and acceleration and other vehicle dynamics. For example, the electric motor may be commanded to decrease its speed by electric braking so as to generate electric energy that is provided to the DC bus, which may quickly increase the voltage of the DC bus. Similarly, the electric motor may be commanded to increase speed by motoring so as to remove electric energy from the DC bus, which may quickly decrease the voltage of the DC bus. In traditional power system architectures, the system cannot react fast enough to alter the operation of the generator and the battery DC-to-DC converter to accommodate these voltage transients. Thus, to accommodate transients caused by braking, traditional power system architectures typically employ a brake resistor to absorb and release excess voltage transients on the DC bus (e.g., above a voltage threshold) in the form of heat in order to maintain a constant DC bus voltage (e.g., within a range). However, brake resistors and their associated cooling systems add to the cost, weight, and complexity of the vehicle. Additionally, any power dissipated to the brake resistor is lost and represents a system inefficiency. Similarly, with respect to motoring transients, traditional power system architectures may not be able to achieve desired vehicle dynamics and response times and may resort to peak shaving by prioritizing different loads on the system.

SUMMARY

In various embodiments, a hybrid electric vehicle power system includes a power control unit having a DC bus, a first power inverter, a second power inverter, a bi-directional DC-to-DC converter, and vehicle power management (VPM) circuitry. The VPM circuitry is configured to determine or estimate an amount of braking current the first power inverter will input on the DC bus simultaneously with beginning to control the first power inverter in braking mode. Also prior to or simultaneously with beginning to control the first power inverter in braking mode, the VPM circuitry determines or estimates an amount of motoring current to provide to a generator via the second power inverter and an amount of charging current to provide to a battery via the DC-to-DC converter. In this manner, the VPM circuitry uses a feedforward control approach, which enables the VPM circuitry to predict current influx or draw by a motor and determine the corresponding currents to provide to or from the generator and battery prior to or simultaneously with the actual current influx or draw by the motor. This improves vehicle dynamics and responsiveness, as well as enables complete recapture of braking currents and eliminates the need for a brake chopper resistor, thereby improving overall vehicle efficiency.

DETAILED DESCRIPTION

Some power system architectures include one or more batteries coupled to the DC bus to store and provide power in the form of current. Some example power system architectures may utilize a DC bus at a greater or otherwise different voltage from the battery voltage. In such examples, a DC-to-DC converter is employed to convert power from the battery voltage to the DC bus voltage. Thus, in such example systems, current may be provided to the DC bus for use by the electric motor (e.g., during motoring) from the generator and/or from the battery. Similarly, current may also be provided the DC bus during braking of the electric motor, which current may be provided back to the generator and/or the battery.

In certain power system architectures, a generator controller can receive voltage feedback readings of the DC bus voltage to control the generator to try to maintain the DC bus voltage at a nominally constant voltage by use of closed-loop voltage control, such as Proportional/Integral (PI)-based voltage control. In such an arrangement, the generator controller operates the generator in a generating mode to convert mechanical energy into electric energy so as to supply electric energy to the DC bus, or a motoring mode to convert electric energy from the DC bus into mechanical energy so as to remove electric energy from the DC bus to assist the engine with mechanical loads. The generator controller may also control or work in concert with the DC-to-DC converter to supply electric energy from the battery to the DC bus or to store excess electric energy from the DC bus in the battery.

The present disclosure provides an improved power system architecture that greatly reduces or eliminates communication delay between disparate control modules such that overall response time of the power system is improved. In traditional power system architectures, vehicle power management functions are spread across multiple different control modules that are interconnected via, for example, a vehicle communications network (e.g., a controller area network (CAN) bus or a similar communication network or protocol). As such, communications to effect the vehicle power management functions require intercommunication outside of the individual control modules, involving an intermediary communication format that is communicated external to the modules. This intermediary communication format injects delays into the vehicle power management functions. Traditional power system architectures accommodate and account for such communication delays by utilizing brake resistors and large DC bus capacitors to prevent over-voltage and under-voltage conditions on the DC bus caused by power transients due to braking, motoring, or other functions.

In various embodiments of the improved power system architecture, vehicle power management circuitry that controls the motor inverter, the generator inverter, and the DC-to-DC converter is collocated within a single power control unit. In such an arrangement, the vehicle power management circuitry can operate much faster than in traditional power system architectures and is capable of utilizing a feedforward power control arrangement rather than a feedback power control arrangement typically employed in the traditional power system architecture. Similarly, the motor inverter, the generator inverter, and the DC-to-DC converter may also be collocated within the single power control unit to enable direct connection with and control by the vehicle power management circuitry, thereby further increasing the speed at which the power system can react to and/or anticipate power fluctuations and dynamic power needs within the power system.

Figure 1:
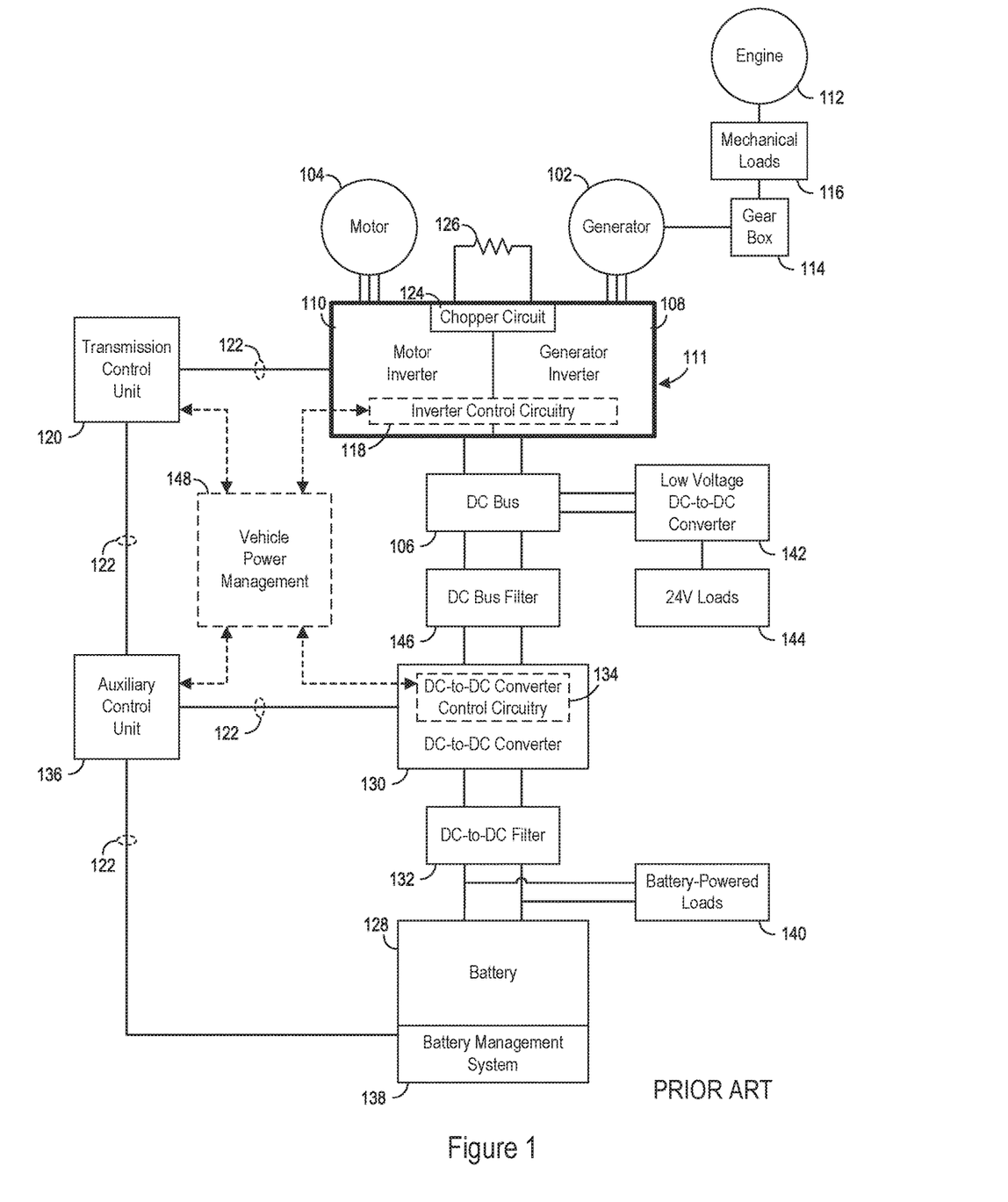
FIG. 1 shows an example prior art power system architecture.
Figure 2:
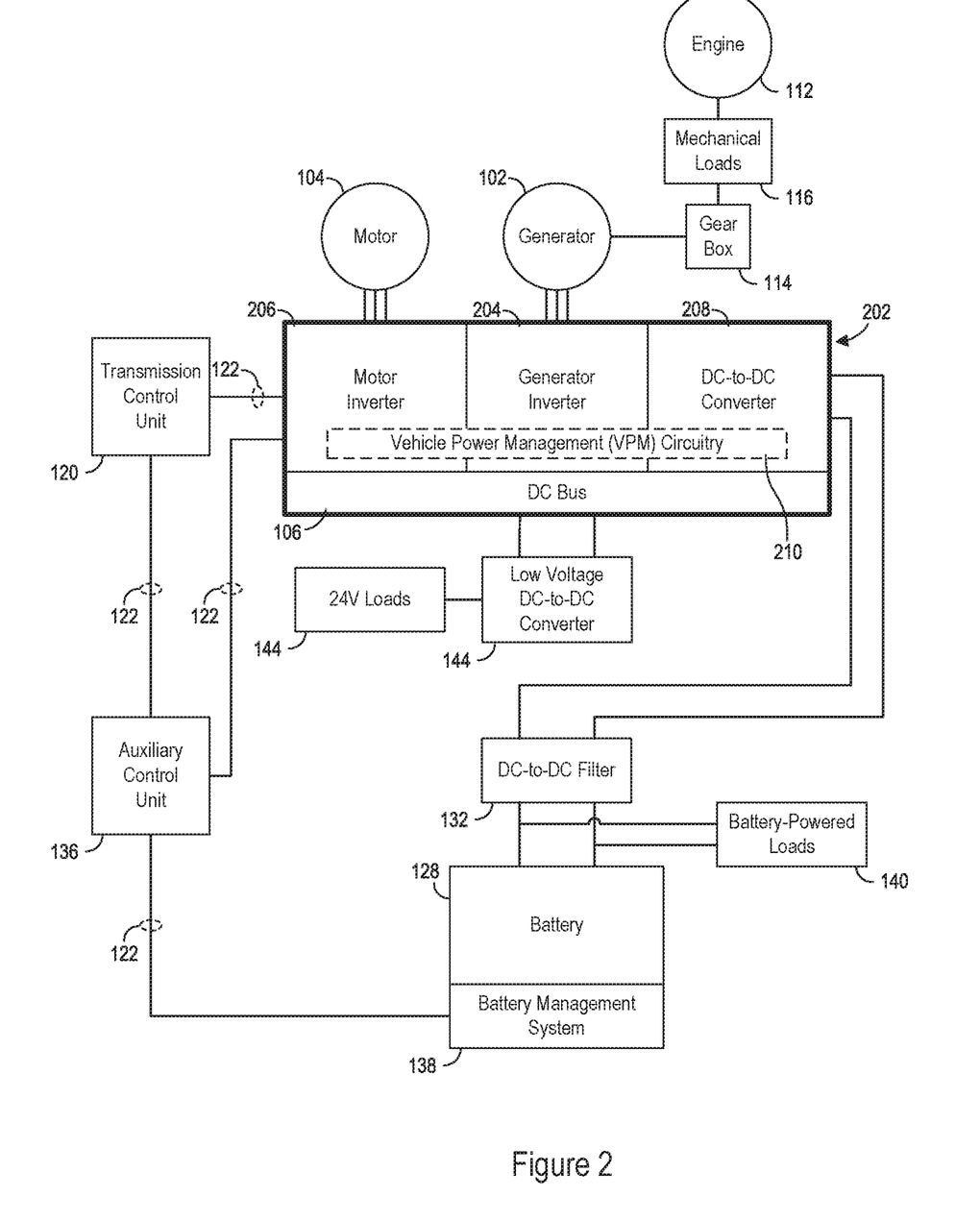
FIG. 2 shows an example improved power system architecture according to various embodiments.

FIG. 1 is an example system diagram of a traditional power system architecture 100 of a hybrid electric vehicle. The traditional architecture 100 includes a generator 102, an electric machine such as an electric motor 104 (e.g., a traction motor), a DC bus 106, a generator inverter 108, and a motor inverter 110. Although only one generator 102 and only one electric motor 104 are illustrated in FIGS. 1 and 2, the power system architectures 100 and 200 may include multiple generators 102 or multiple motors 104. The generator 102 is electrically coupled to the DC bus via the generator inverter 108, and the electric motor 104 is electrically coupled to the DC bus via the generator inverter 108. The generator inverter 108 and the motor inverter 110 may be formed in a single inverter module 111.

The generator 102 may be coupled to a powertrain including a power sources such as an engine 112 configured to provide motive power for the vehicle. The engine 112 may be configured, for example, as a diesel engine or other internal combustion engine and may operate at a generally constant speed (e.g., 1800 revolutions per minute), although the engine may experience, or be allowed to experience, some minimal speed variation due to, for example, load on the engine or mechanical energy put back on the powertrain and engine 112 by motoring the generator 102.

The engine 112 may be coupled directly or indirectly to the generator 102 to establish a mechanical or other connection between the engine 112 and the generator 102. For example, a gearbox 114 may be coupled between the engine 112 and the generator 102 and provides a change in speed between the rotation of the engine 112 and the generator 102. The engine 112 (or the gearbox 114) may have a number of other outputs to provide power to one or more mechanical loads 116 of the vehicle, such as hydraulic pumps (e.g., to operate a bucket 602, see FIG. 6)), cooling pumps, and cooling fans.

The generator 102 may be configured to convert mechanical energy into electric energy ("generating mode"), or to convert electric energy into mechanical energy like a motor ("motoring mode"). In the generating mode, the generator 102 is operable to convert mechanical energy from the engine 112 into electric energy to supply electric energy onto the DC bus 106. In the motoring mode, the generator 102 is operable to remove electric energy from the DC bus 106 and convert it into mechanical energy, which may be useful, for example, to assist the engine 112 with the mechanical loads 116 such as, for example, operating a hydraulic load (e.g., raise a bucket 602 hydraulically). In one example, the generator 102 may take the form of a high-speed three-phase interior-permanent-magnet brushless synchronous generator having three phase coils, or other suitable forms.

Similarly, the electric motor 104 may be configured to convert electrical energy into mechanical energy ("motoring mode"), or to convert mechanical energy into electric energy ("braking mode"). In the motoring mode, the motor 104 is operable to consume electric energy from the DC bus 106 and convert it into mechanical energy. In the braking mode, the motor 104 is operable to convert mechanical energy into electric energy so as to supply electric energy onto the DC bus 106 thereby braking (i.e., slowing down) the rotational speed of the motor 104 and thus the speed of the vehicle. In one example, the motor 104 may include a three-phase interior-permanent-magnet brushless synchronous motor having three phase coils, or other suitable form, which is operable at a variable speed within a speed range (negative and positive speed limit).

The generator inverter 108 is electrically coupled to the generator 102 and the DC bus 106 and is configured to operate the generator 102 in generating mode or motoring mode by converting AC power from the generator 102 to DC power on the DC bus 106, and vice versa, according to control signals from inverter control circuitry 118, which ultimately controls the power from or to the generator 102 based on the constraints of the torque and rotational speed.

Similarly, the motor inverter 110 is electrically coupled to the motor 104 and the DC bus 106 and is configured to operate the motor 104 in motoring mode or braking mode by converting DC power on the DC bus 106 to AC power for the motor 104, and vice versa, according to control signals from the inverter control circuitry 118, which ultimately controls the electric motor torque, rotational speed, and direction.

In the traditional power system architecture 100, the generator 102 and generator inverter 108 may be under the control of the inverter control circuitry 118. The inverter control circuitry 118 may receive a DC bus voltage command from a transmission controller (TCU) 120 via a communications bus 122 (e.g., CAN bus) commanding the inverter control circuitry 118 to control the generator 102 via the generator inverter 108 so as to try to maintain the voltage of the DC bus 106 at a nominally constant voltage (the nominal DC bus voltage) (e.g., 700 VDC). The inverter control circuitry 118 may receive voltage readings of the actual voltage of the DC bus 106 from a voltage sensor coupled electrically to the DC bus 106. Using closed-loop feedback voltage control, such as Proportional/Integral (PI)-based voltage control, the inverter control circuitry 118 may operate the generator 102 in the generating mode or the motoring mode to try to maintain the voltage of the DC bus 106 nominally at the nominal DC bus voltage. The inverter control circuitry 118 may determine a generator torque setpoint $T_{gen}$ at which to operate the generator 102 via the generator inverter 108 to achieve the nominal DC bus voltage, and may command operation of the generator 102 at such setpoint via the generator inverter 108.

The motor 104 and the motor inverter 110 may be under the control of the inverter control circuitry 118. The inverter control circuitry 118 may receive a torque request from the TCU 120. The torque request may be for motoring in the motoring mode or electric braking in the braking mode. The inverter control circuitry 118 may establish a motor torque setpoint $T_{mot}$ at the torque request or adjust the motor torque setpoint $T_{mot}$ from the torque request if it determines there is a need to so. The inverter control circuitry 118 may thereafter command operation of the motor 104 via motor inverter 110 at the motor torque setpoint $T_{mot}$.

The DC bus 106 may be coupled to a brake chopper circuit 124 that controls the flow of current from the DC bus 106 to a brake resistor 126 to dissipate excess electric power in the form of heat. The brake resistor 126 may be cooled via liquid coolant. As discussed above, the brake chopper circuit 124 may be activated to dissipate excess electric power (transients) on the DC bus 106 due to the rapid influx of current onto the DC bus 106 from the motor 104 via the motor inverter 110 during motor braking. The inverter control circuitry 118 may issue pulse-width modulated (PWM) signals to operate a switch (e.g., an insulated-gate bipolar transistor (IGBT)) of the brake chopper circuit 124 to dissipate the excess power whenever the voltage on the DC bus 106 exceeds a threshold.

The traditional power system architecture 100 may also include a battery 128 electrically coupled to the DC bus 106 via a DC-to-DC converter 130. The battery 128 may comprise one or more batteries that operate in a range of, for example, 290 volts to 390 volts, with a nominal battery voltage of 320 volts. The DC-to-DC converter 130 is a bi-directional DC-to-DC converter that is electrically coupled to the DC bus 106 and the battery 128 and converts power from the battery 128 (at 320 volts) to power on the DC bus 106 (at 700 volts) in a boost mode, and converts power from the DC bus 106 to power to be stored in the battery 128 in a buck mode.

The DC-to-DC converter 130 may be coupled to a DC-to-DC filter 132 located between the DC-to-DC converter 130 and the battery 128. The DC-to-DC filter 132 filters ripple on the switched voltage output of the DC-to-DC converter 130 caused by the switches within the DC-to-DC converter 130 on the DC lines to the battery 128 to better condition power to be provided to or from the battery 128. In the traditional power system architecture 100, the DC-to-DC converter is a separate module from the generator inverter 108 and motor inverter 110 in an inverter module 111. As such, the DC-to-DC converter 130 may include DC-to-DC converter control circuitry 134 to control the operation of the DC-to-DC converter 130. The DC-to-DC converter control circuitry 134 communicates via the communications bus 122 with an auxiliary control unit 136 to receive commands to provide power from the battery 128 to the DC bus 106 or vice versa.

The traditional power system architecture 100 also includes a battery management system (BMS) 138 electrically coupled to the battery 128 to monitor the status and health of the battery 128. The BMS 138 may communicate battery status and battery health data to the auxiliary control unit 136 and receive information or commands from the auxiliary control unit 136 via the communications bus 122.

The battery 128 may be electrically coupled to one or more battery-powered loads 140 to provide power to the battery-powered loads 140. One example battery-powered load 140 may include an air conditioning unit that may provide air conditioning to the cabin 608 when the engine 112 is stopped and/or the vehicle is in battery-only mode. Similarly, a low voltage DC-to-DC converter 142 may also be electrically coupled to the DC bus 106 to receive and convert power from the DC bus voltage (e.g., 700 volts) to a low voltage (e.g., 24 volts) to power low voltage loads 144 and systems within the vehicle. A DC bus filter 146 is also electrically coupled to the DC bus 106 and the DC-to-DC converter 130 to filter harmonic oscillations that may develop on the DC bus 106 due to the fact that the inverter module 111 and the DC-to-DC converter 130 are separate modules and controlled subject to communications delays caused by the communication bus 122.

Vehicle power management functions 148 are represented symbolically in FIG. 1. The vehicle power manager functions 148 represent a set of control algorithms and functions that are executed through coordinated processing and control by separate modules. For example, the vehicle power manager functions 148 are executed with coordinated processing involving the TCU 120, the inverter control circuitry 118, the DC-to-DC converter control circuitry 134, and the auxiliary control unit 136. As mentioned above, the TCU 120 may send torque commands for motoring or braking the motor 104 to the inverter control circuitry 118. The inverter control circuitry 118 may then directly control the motor inverter 110 to the motor 104 to accelerate or brake according to the torque commands from the TCU 120. Similarly, the inverter control circuitry 118 may directly control the generator inverter 108 to generate current from the generator 102 to the DC bus 106, or vice versa, according to the closed-loop feedback voltage control relying on the feedback of the DC bus voltage. Additionally, the inverter control circuitry 118 may command the DC-to-DC converter 130 to provide power to the DC bus 106 from the battery 128, or vice versa.

In the traditional power system architecture 100, communications between the inverter control circuitry 118 and the DC-to-DC converter control circuitry 134 must be converted to a format of the communication bus 122 and are subject to the protocol of the communication bus 122 (e.g., according to the CAN bus protocol and format, or another protocol or format). Further such communications must be communicated through the TCU 120 and/or the auxiliary control unit 136 before reaching the DC-to-DC converter control circuitry 134. The conversion to and from the protocol and format of the communication bus 122, and the communication path involving intermediary modules such as the TCU 120 and the auxiliary control unit 136, introduce significant communication delay between the inverter control circuitry 118 and the DC-to-DC converter control circuitry 134 (e.g., around 100 ms or higher). The communication delay is greater than the time in which power transients can be introduced on the DC bus 106 that will exceed an overvoltage trip voltage, for example during motor braking. As such, in the traditional power system architecture 100, the DC-to-DC converter cannot begin operating quickly enough to accommodate such transients by storing excess power from the DC bus 106 in the battery 128 or providing additional power to the DC bus 106 from the battery 128. Similarly, there is a delay in the time that the generator inverter 108 can control the generator 102 to provide current to or remove from the DC bus 106 due to the mechanical nature of the generator 102 and the inherent delay involved in utilizing a feedback control scheme based on measuring the DC bus voltage. Further, the amount of current that can be sunk via motoring the generator 102 is limited or the generator 102 will begin to fight the power of the engine 112. Thus, the traditional power system architecture 100 relies on the brake chopper circuit 124 and the brake resistor 126, as well as an increased size DC bus capacitor, to accommodate high transients (e.g., during motor braking). Similarly, the traditional power system architecture 100 relies on an increased motor size to provide the necessary power during peak loads, and peak load shaving control methods to accommodate high power demand transients (which reduce the DC bus voltage). As discussed above, such arrangements are not optimal.

FIG. 2 is an example system diagram of an improved power system architecture 200 of a hybrid electric vehicle in accordance with various embodiments. As with the traditional power system architecture 100 in FIG. 1, the improved architecture 200 includes a generator 102 coupled to a powertrain including the engine 112 and possibly a gearbox 114, either of which may provide power to other mechanical loads 116 of the vehicle, as discussed above with respect to FIG. 1. Similarly, the improved architecture 200 includes the electric motor 104, which may be coupled to the wheels of the vehicle to move the vehicle (though other uses for the electric motor 104 are contemplated), as discussed above with respect to FIG. 1. Additionally, the improved architecture includes the battery 128, BMS 138, DC-to-DC filter 132, low voltage DC-to-DC converter 142, low voltage loads 144, battery-powered loads 140, TCU 120 and auxiliary control unit 136, each of which operates largely as discussed with respect to FIG. 1.

Instead of disparate inverter modules and DC-to-DC converter module that communicate and operate across a communications bus 122, the improved power system architecture 200 utilizes a single power control unit 202. In certain embodiments, the power control unit 202 includes a generator inverter 204, a motor inverter 206, and a DC-to-DC converter 208 all collocated within the single power control unit 202. The generator inverter 204 operates similarly to the generator inverter 108 of FIG. 1 in that it is electrically coupled to the DC bus 106 and configured to control the generator 102 and provide current to the generator 102 from the DC bus 106 (e.g., by motoring the generator 102) and to input current from the generator 102 to the DC bus 106 (when operating in generating mode). Also, the motor inverter 206 operates similarly to the motor inverter 110 of FIG. 1 in that it is electrically coupled to the DC bus 106 and configured to control the electric motor 104 and provide current to the electric motor 104 from the DC bus 106 (e.g., by motoring the motor 104) and to input current from the electric motor 104 to the DC bus 106 (e.g., by braking the motor 104). Additionally, the DC-to-DC converter 208 also operates similarly to the DC-to-DC converter 130 of FIG. 1 in that it is a bi-directional DC-to-DC converter and is electrically coupled to the DC bus 106 and the battery 128 and is configured to convert voltage between the DC bus 106 (e.g., 700 volts) and the battery (e.g., 320 volts).

The single power control unit 202 also includes vehicle power management (VPM) circuitry 210 that controls the operation of the power control unit 202, including the operation of the generator inverter 204, the motor inverter 206, and the DC-to-DC converter 208. In various embodiments, the VPM circuitry 210 may comprise a single circuit board or multiple circuit boards that intercommunicate very rapidly utilizing one or more internal computer bus protocols (e.g., inter-integrated circuit bus (IIC), serial peripheral interface (SPI) bus, synchronous serial interface (SSI) bus) or other fast serial or parallel bus communication protocols designed for short distances.

The majority of the vehicle power management functions 148 discussed in FIG. 1 are implemented in the VPM circuitry 210 of the power control unit 202. This centralized VPM circuitry 210 is unlike the traditional power system architecture 100 of FIG. 1, where the vehicle power management functions 148 where split between the inverter control circuitry 118 and the DC-to-DC converter control circuitry 134, and communications between the inverter control circuitry 118 and the DC-to-DC converter control circuitry 134 occurs across an intermediary communications bus 122 utilizing an intermediary communication format communicated external to either module, and passing through other intermediary modules, thereby introducing significant delay in the control of the different modules. Instead, the single power control unit 202 in FIG. 2 houses all of the control circuitry within the VPM circuitry 210, allowing direct connection and direct communication between circuit components and/or software modules that directly control the operations of the generator inverter 204, motor inverter 206, and DC-to-DC converter 208 with substantially zero communication delay. In this manner, the power control unit 202 of the improved power system architecture 200 is able to operate without the communication delay realized in the traditional power system architecture 100. More specifically, the VPM circuitry 210 is able to rapidly control the DC-to-DC converter 208 to quickly provide current to the DC bus 106 from the battery 128, and vice versa, as needed with essentially no delay, or at least a negligible delay in comparison to the communication delay in the traditional power system architecture 100.

With the reduced or eliminated delay in control, the VPM circuitry 210 can directly control the DC-to-DC converter 208 to quickly store the rapid influx of current to the DC bus 106 caused by motor braking in the battery 128, thereby reducing or eliminating rising power transients on the DC bus 106. Similarly, the VPM circuitry 210 can directly control the DC-to-DC converter 208 to quickly provide current to the DC bus 106 from the battery 128 to accommodate rapid power usage by the motor 104 during motoring (or by other loads), thereby reducing or eliminating low power transients on the DC bus 106 and improving overall vehicle dynamics and responsiveness.

Because of the increased speed of the VPM circuitry 210, the VPM circuitry 210 is capable of utilizing a feedforward power control arrangement rather than the feedback power control arrangement typically employed in the traditional power system architecture 100. The VPM circuitry 210 receives a motor torque command from the TCU 120 (e.g., to motor or brake the motor 104). The VPM circuitry 210 is configured to determine (e.g., predict, estimate, or anticipate) the amount of current or power that will be input onto the DC bus 106 by braking the motor 104, or will be consumed by the motor 104 by motoring the motor 104, prior to or simultaneously with the VPM circuitry 210 beginning to brake or motor the motor 104 via the motor inverter 206. The VPM circuitry 210 also is aware of the present status and capabilities of the generator 102 to sink or provide current or power to/from the DC bus 106. With this information, during braking, the VPM circuitry 210 can determine a charging current or power to provide to the battery 128 from the DC bus 106 via the DC-to-DC converter 208, and a motoring current or power to provide to the generator 102 from the DC bus 106 via the generator inverter 204 prior to or simultaneously with the VPM circuitry 210 beginning to brake the motor 104 via the motor inverter 206.

For example, during braking, the feedforward current path computation may be $P_{motor}=P_{batt\_ff}+P_{gen\_ff}$ or $I_{motor}=I_{batt\_ff}+I_{gen\_ff}$. In certain examples, the amount of current or power the generator 102 can sink is limited such that the generator 102 cannot keep up with all of the incoming power from the motor braking. In such examples, the DC bus voltage control is achieved via the battery 128. As such, the feedforward path computation can be understood as $P_{batt\_ff}=P_{motor}-P_{gen}$. A charging current that the DC-to-DC converter 208 pulls from the DC bus 106 and provides to the battery 128 for storage therein can be determined based on the voltage of either the DC bus or the voltage of the battery, depending on which side of the DC-to-DC converter 208 is analyzed. For example, the current the DC-to-DC converter 208 sinks from the DC bus 106 can be calculated as $I_{batt\_ff}=(P_{motor}-P_{gen})/V_{DC\_bus}$, whereas the current the DC-to-DC converter 208 provides to the battery 128 can be calculated as $I_{batt\_ff}=(P_{motor}-P_{gen})/V_{batt}$.

In one example, the VPM circuitry 210 predicts (e.g., estimates or anticipates) the current that will be input on to the DC bus 106 or consumed from the DC bus 106 by the motor 104 or the generator 102 using a lookup table. The lookup table may include values that correspond to the instantaneous speed of the motor 104 or generator 102, the torque demands on the motor 104 or generator 102, and the resulting power or current used by or generated by the motor 104 or generator 102. The lookup table may take into account a known efficiency of the system, which may be static or may vary based on speed or torque. Alternatively, the VPM circuitry 210 may calculate the predicted currents in real-time using an equation, such as $P_{motor}=T_{motor} \times \omega_{motor}$, where $P_{motor}$ the power of the motor 104, $T_{motor}$ is the torque of the is motor 104, and $\omega_{motor}$ is the speed of the motor 104. The power $P_{motor}$ may be multiplied by an efficiency coefficient, (e.g., 0.95) representing a calculated or observed efficiency of the conversion process. The same or similar equation may be used for the generator 102 as well. Current can of course be derived from power via the power law equation $P=V \times I$.

The VPM circuitry 210 can repeatedly and/or periodically perform the above feedforward determinations or predictions for the currents throughout the entire braking process, or continuously during operation of the vehicle. In essence, the VPM circuitry 210 continuously estimates or anticipates power usage and power generation based on control inputs, vehicle conditions, motor 104 or generator 102 speed, and real-time actual power usage or generation measurements in a feedforward manner to continuously determine or update currents to provide to and from the generator 102 and/or the battery 128 prior to or simultaneously with the actual power usage or generation effected by the motor 104 or other loads. The VPM circuitry 210 can also estimate or anticipate the power usage and power generation based on historical or empirical studies, such as stored reference response of braking current versus time during braking mode based on vehicle load, accelerometer measurements, odometer measurements, vehicle ground speed, vehicle velocity, vehicle mass/weight, or other vehicle parameters. Similarly, the VPM circuitry 210 can estimate or anticipate the power usage and power generation based on historical or empirical studies, such as stored reference response of motoring current versus time during motoring mode based on vehicle load, vehicle velocity, commanded torque, commanded velocity, accelerometer measurements, odometer measurements, drivetrain or transmission gear ratio, fuel metering or regulated fuel input, engine revolutions per minute, vehicle mass/weight, or other vehicle parameters. This information can exist in one or more lookup tables or other data structure formats, which can be stored in the memory 318 of the VPM circuitry 210 (see FIG. 3).

Additionally, after the VPM circuitry 210 performs the current or power determinations or predictions, and prior to or simultaneously with the VPM circuitry 210 beginning to brake the motor 104 via the motor inverter 206, the VPM circuitry 210 can begin controlling the DC-to-DC converter 208 to begin providing the calculated charging current or power to the battery 128 from the DC bus 106 via the DC-to-DC converter 208, and begin controlling the generator inverter 204 to begin providing the calculated motoring current or power to the generator 102 from the DC bus 106 via the generator inverter 204. In this manner, all of the power or current that is generated by the motor 104 throughout the entirety of a braking procedure can be provided to the generator 102 and/or the battery 128. This improves the efficiency of the vehicle.

Because the transients on the DC bus 106 are handled directly by the generator inverter 204 and DC-to-DC converter 208, the brake chopper circuit 124 and brake resistor 126 of FIG. 1 are no longer needed and are omitted in the improved power system architecture 200 of FIG. 2. Similarly, because the VPM circuitry 210 can operate quickly to control the DC bus voltage via the generator 102 and/or the battery 128, the power control unit 202 may also utilize a smaller DC bus capacitor. Additionally, the separate DC-to-DC converter 130 is eliminated in the improved architecture 200, thereby reducing cost and complexity of the vehicle. Also, because the generator inverter 108, motor inverter 110, and DC-to-DC converter 208 are all collocated within the single power control unit and controlled by the same VPM circuitry 210, the DC bus filter 146 of FIG. 1 is no longer required, representing further reduction in cost and complexity.

Figure 3:
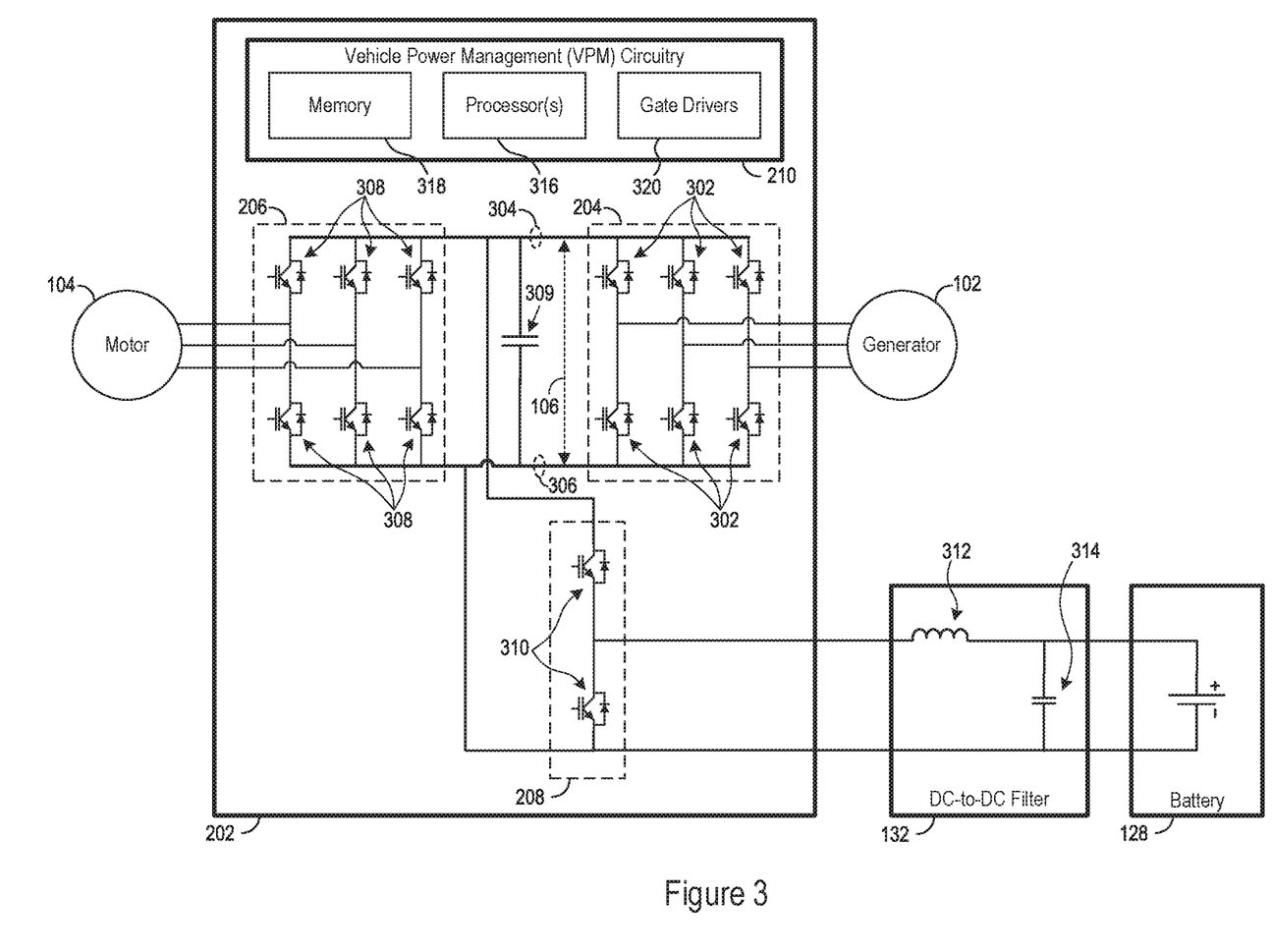
FIG. 3 shows an example schematic diagram of a power control unit of the improved power system architecture of FIG. 2 in accordance with various embodiments.

FIG. 3 shows an example schematic diagram of a power control unit 202 of the improved power system architecture 200 of FIG. 2 in accordance with various embodiments. As discussed above with respect to FIG. 2, the power control unit 202 includes the generator inverter 204, the motor inverter 206, the DC-to-DC converter 208, the DC bus 106, and VPM circuitry 210. In certain embodiments, the power control unit 202 may be a model PD400 Dual Power Inverter manufactured and sold by John Deere (Moline, Ill.).

The generator inverter 204 may comprise a typical power converter in the form of an AC-to-DC converter, as illustrated, to convert three-phase AC power from the generator 102 into DC power for the DC bus 106. The generator inverter 204 may include six insulated-gate bipolar junction transistor (IGBT) packages 302, each IGBT package 302 including a diode and an IGBT (operating as a switch). Each IGBT package 302 may comprise a single diode and IGBT, or multiple packages operating identically in parallel. Respective IGBT packages 302 may be coupled to a respective one of the generator 102 phase coils to convert AC power from that coil into DC power on the DC bus 106 at a nominal voltage of, for example, 700 volts DC between the positive DC power rail 304 and the negative DC power rail 306 (which rails together form the DC bus 106). When the appropriate voltage is applied to the base of an IGBT of the generator inverter 204, the switch (i.e., the IGBT) may be activated and the collector may be coupled electrically to the emitter to pass electric power through the IGBT to the DC bus 106. The generator inverter 204 can be operated in reverse when the generator 102 is motoring (e.g., to assist the engine 112 with mechanical loads 116) by changing the switching timing of the IGBT packages 302.

The motor inverter 206 may operate in the same manner as the generator inverter 204, as a DC-to-AC inverter to convert DC power from the DC bus 106 into three-phase AC power for the motor 104. The motor inverter 206 may include six IGBT packages 308 arranged similarly or identically to the six IGBT packages 302 of the generator inverter 204, with respective IGBT packages 308 coupled to a respective one of the motor 104 phase coils. When the appropriate voltage is applied to the base of an IGBT of the motor inverter 206, the switch (i.e., the IGBT) is activated and the collector may be coupled electrically to the emitter to supply electric power to the respective coil of the motor 104 to drive the motor. The motor inverter 206 is operated in reverse to brake the motor 104 (causing the motor 104 to operate as a generator) by changing the switching timing of the IGBT packages 308.

The DC bus 106 may also include a DC bus capacitor 309 connected across the positive DC power rail 304 and the negative DC power rail 306 to help maintain the voltage on the DC bus 106 and filter out ripple caused by switching of the IGBT packages 302, 308, and 310. The DC bus capacitor 309 may be internal to the power control unit 202 or may be located external to the power control unit 202.

Typically, such a power control unit provides a brake chopper circuit, as discussed with respect to FIG. 1. However, in the improved power system architecture 200, the IGBT leg that was previously used for the brake chopper circuit is repurposed and reconfigured as the DC-to-DC converter 208. The VPM circuitry 210 controls the switching of the IGBT packages 310 of the DC-to-DC converter 208 to operate the DC-to-DC converter 208 in a boost mode or a buck mode via PWM switching signals.

In the traditional power system architecture 100 of FIG. 1, the outputs of the brake chopper circuit are connected to a brake resistor 126 to dissipate the power as heat. However, in the improved power system architecture 200, those outputs are repurposed for the DC-to-DC converter 208 and are electrically coupled to the battery 128 through the DC-to-DC filter 132. The DC-to-DC filter 132 may include one or more inductors 312 (e.g., one 100 uH inductor) in series with at least one of the output lines, and at least one capacitor 314 (e.g., two 3.5 mF capacitors) connected across both output lines. The DC-to-DC filter 132 filters ripple caused by the IGBT packages 310 within the DC-to-DC converter 130 on the DC lines to the battery 128 to better condition power to be provided to or from the battery 128. The saturation current of the inductors 312 may represent the upper limit of the current that can be provided to the battery 128 (e.g., about 250 amps with the 100 uH inductor).

The power control unit 202 also includes the VPM circuitry 210, which may include one or more processors 316, one or more memories 318 coupled to the processor 316, and a set of gate drivers 320 coupled to the processor 316 and coupled to and configured to drive the various IGBT packages 302, 308, and 310 in the power control unit 202 via gate signals. The VPM circuitry 210 receives information and commands from external units, such as the TCU 120 and/or the auxiliary control unit 136 and processes data and algorithms. The VPM circuitry 210 determines the specific control aspects of the generator inverter 204, the motor inverter 206, and the DC-to-DC converter 208 and directly controls (e.g., via the gate signals from the gate drivers 320) the generator inverter 204, motor inverter 206, and the DC-to-DC converter 208 without utilizing communication protocols, formats, or pathways external to the power control unit 202.

The VPM circuitry 210 may be implemented in many different ways and in many different combinations of hardware and software. For example, the VPM circuitry 210 may include the one or more processors 316, such as a Central Processing Unit (CPU), microcontroller, or a microprocessor. Similarly, the VPM circuitry 210 may include or be implemented with an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. As mentioned above, communication between different circuitry elements and/or modules (e.g., hardware modules or software modules) is implemented via fast data communication protocols or between different software modules within the processor 316 and is therefore subject only to negligible communication delays, unlike the traditional power system architecture 100.

The VPM circuitry 210 may include the memory 318 or other tangible storage mediums other than a transitory signal, and may comprise a flash memory, a Random Access Memory (RAM), a Read Only Memory (ROM), an Erasable Programmable Read Only Memory (EPROM), a Hard Disk Drive (HDD), or other magnetic or optical disk; or another machine-readable nonvolatile medium. The memory 318 may store therein software modules and instructions that, when executed by the processor 316, cause the VPM circuitry 210 to implement any of the processes described herein or illustrated in the drawings. The memory 318 may also store other data for use by the processor 316 such as, for example, control reference information for the braking mode and motoring mode, such as reference profiles of braking current or motoring current versus time, which may be based on vehicle load, accelerometer measurements, odometer measurements, vehicle ground speed, vehicle velocity, vehicle mass/weight, commanded torque, commanded velocity, drivetrain or transmission gear ratios, fuel metering or regulated fuel input, engine revolutions per minute, or other vehicle parameters. Such data may be stored in lookup tables or other data structures for storing the reference information and/or other vehicle parameters. In one example, the processor 316 may execute different software modules consisting of processes and algorithms that are used to control the motor inverter 206, the generator inverter 204, and the DC-to-DC converter. For example, the processor 316 (or multiple interconnected processors) may execute a motor inverter control module to control operations of the motor inverter 206, a generator inverter control module to control operations of the generator inverter 204, and a DC-to-DC converter module to control operations of the DC-to-DC converter 208. In certain examples, the different modules may communicate directly within the processor by having direct access to the memory 318, or a cache or memory within the processor 316, such that communication between the modules is nearly instantaneous. Such instantaneous communication is much faster than the traditional communication methodologies and protocols (e.g., CAN bus) conventionally used to communicate between disparate modules.

Figure 4:
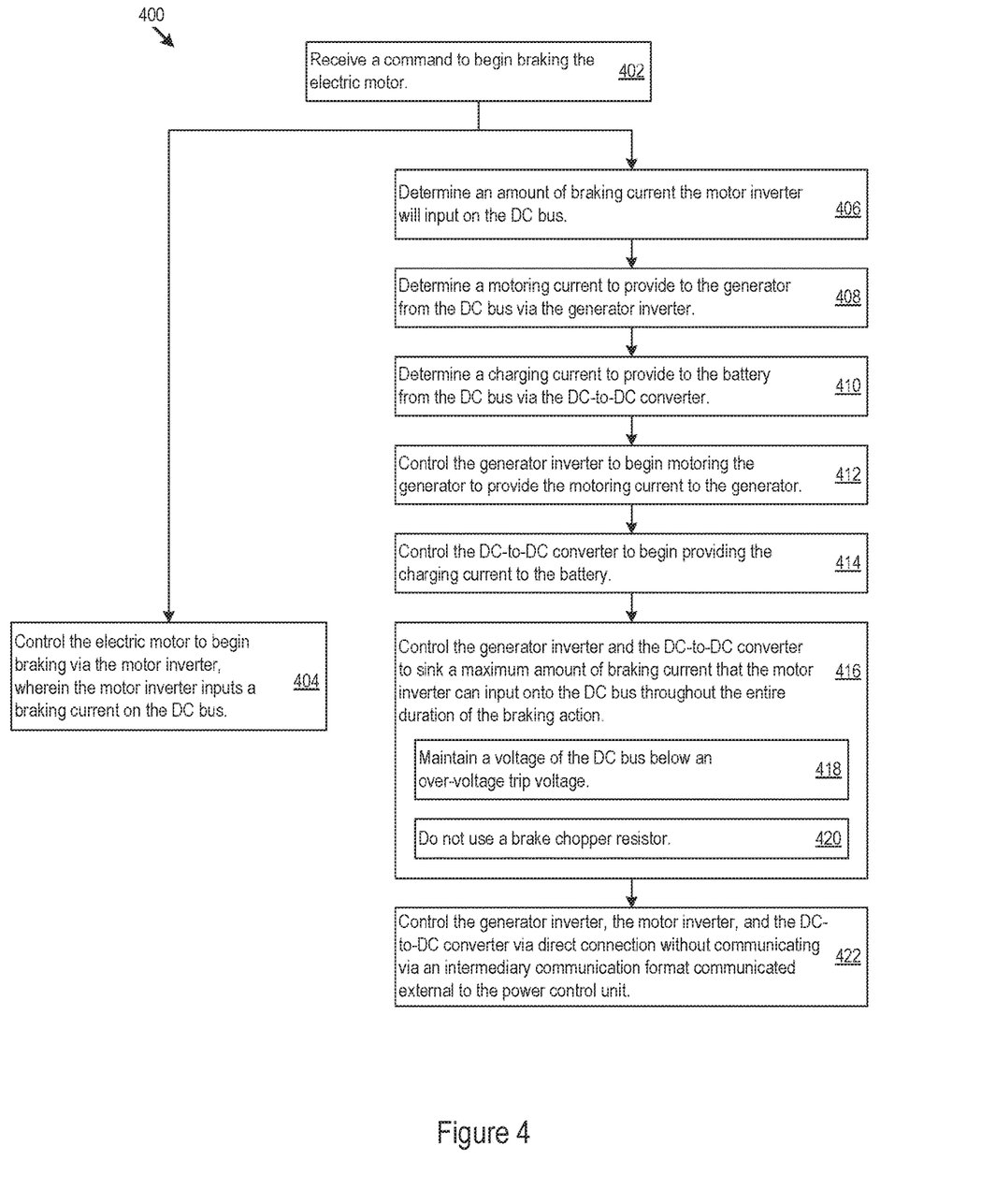
FIG. 4 shows an example flow diagram of logic that the improved power system architecture of FIG. 2 may implement in accordance with various embodiments.

FIG. 4 shows an example flow diagram of a method 400 the improved power system architecture of FIG. 2, and particularly the VPM circuitry 210, may implement in accordance with various embodiments. At 402, the VPM circuitry 210 receives a command from the TCU 120 to begin braking the electric motor 104. At 404, responsive to receiving the braking command, the VPM circuitry 210 begins controlling the electric motor in the braking mode, via the motor inverter 206, to begin braking. As a result, the motor inverter 206 inputs a braking current onto the DC bus 106 generated by the electric motor 104.

At 406, also responsive to receiving the command to begin braking the electric motor 104 (step 402), the VPM circuitry 210 determines (e.g., predicts, estimates, anticipates, or calculates) an amount of braking current the motor inverter 206 will input on the DC bus 106 from the electric motor 104. With this information, at 408, the VPM circuitry 210 determines (e.g., predicts, estimates, anticipates, or calculates) a motoring current or power to provide to the generator 102 from the DC bus 106 via the generator inverter 204. Similarly, at 410, the VPM circuitry 210 determines a charging current to provide to the battery 128 from the DC bus 106 via the DC-to-DC converter 208. In one approach, the VPM circuitry 210 determines the motoring current and the charging current such that the sum of the motoring current and the charging current are substantially equal to the braking current. At 412, the VPM circuitry 210 begins controlling the generator inverter 204 to begin operating the generator 102 in the motoring mode to provide the motoring current to the generator 102. Similarly, at 414, the VPM circuitry 210 begins controlling the DC-to-DC converter 208 to begin providing the charging current to the battery 128 for storage in the battery.

In certain approaches, the VPM circuitry 210 begins and/or completes steps 406, 408, and 410 prior to or simultaneously with the motor inverter 206 beginning to brake the motor 104 and beginning to input the braking current on the DC bus 106 (step 404). Also, the VPM circuitry 210 begins steps 412 and 414 prior to or simultaneously with the motor inverter 206 beginning to brake the motor 104 and beginning to input the braking current on the DC bus 106 (step 404). In this arrangement, the VPM circuitry 210 provides feed-forward determinations of an amount of current to be absorbed or sunk by each of the generator 102 and the battery 128, and subsequently controls the generator inverter 204 and the DC-to-DC converter 208 according to those determinations. This reduces or prevents rising transients on the DC bus 106 caused by the rapid influx of current from the motor 104 during braking, and enables capture and reuse of that power generated during braking to improve vehicle efficiency.

In certain embodiments, the braking current includes, at least at some point during a braking operation, a maximum amount of braking current that the motor 104 can generate during braking and input onto the DC bus 106 through the motor inverter 206. However, despite this maximum influx of current, the VPM circuitry 210 can still determine the motoring current (to the generator 102) and the charging current (to the battery 128) such that the sum of the motoring current and the charging current are substantially equal to the braking current. Further, the VPM circuitry 210 can make this determination through the entire duration of a braking action. In this manner, as shown at 416, the VPM circuitry 210 can control the generator inverter 204 and the DC-to-DC converter 208 to sink a maximum amount of braking current that the motor inverter 206 can input onto the DC bus 106 throughout the entire duration of the braking action. Similarly, at 418 and 420 the VPM circuitry 210 can control the generator inverter 204 and the DC-to-DC converter 208 to sink the maximum amount of braking current that the motor inverter 206 can input onto the DC bus 106 while maintaining a voltage of the DC bus 106 below an over-voltage trip voltage and/or without using a brake chopper resistor. More specifically, in some embodiments of the instant method 400, the system does not use a brake chopper resistor during the braking action, as shown in step 420. In some embodiments, the over-voltage trip voltage is defined as a set range (e.g., 25, 50, or 75 volts, or a set percentage such as 3%, 5%, 7%, or 10%, or some other specified or designated voltage range or value) in relation to the specified nominal DC bus voltage (e.g., 700 volts). For example, the over-voltage trip voltage may be 750 volts if a maximum of 50 volts over the nominal voltage of 700 volts is selected. In some embodiments, the vehicle can also utilize a traditional mechanical brake to slow or stop the vehicle, for example in emergency situations, such as if a malfunction occurs, or situations where the battery 128 is fully charged and cannot accept additional charge. Further, in such embodiments, the VPM circuitry 210 may de-rate the motoring of the electric motor 104, possibly to zero, to prevent the influx of current to the DC bus 106 that cannot be sunk to the battery 128 or the generator 102 to prevent over-voltage on the DC bus 106.

As discussed above, in certain embodiments, at 422, the VPM circuitry 210 can control the generator inverter 204, the motor inverter 206, and the bi-directional DC-to-DC converter 208 via direct connection without communicating via an intermediary communication format communicated external to the power control unit 202.

Figure 5:
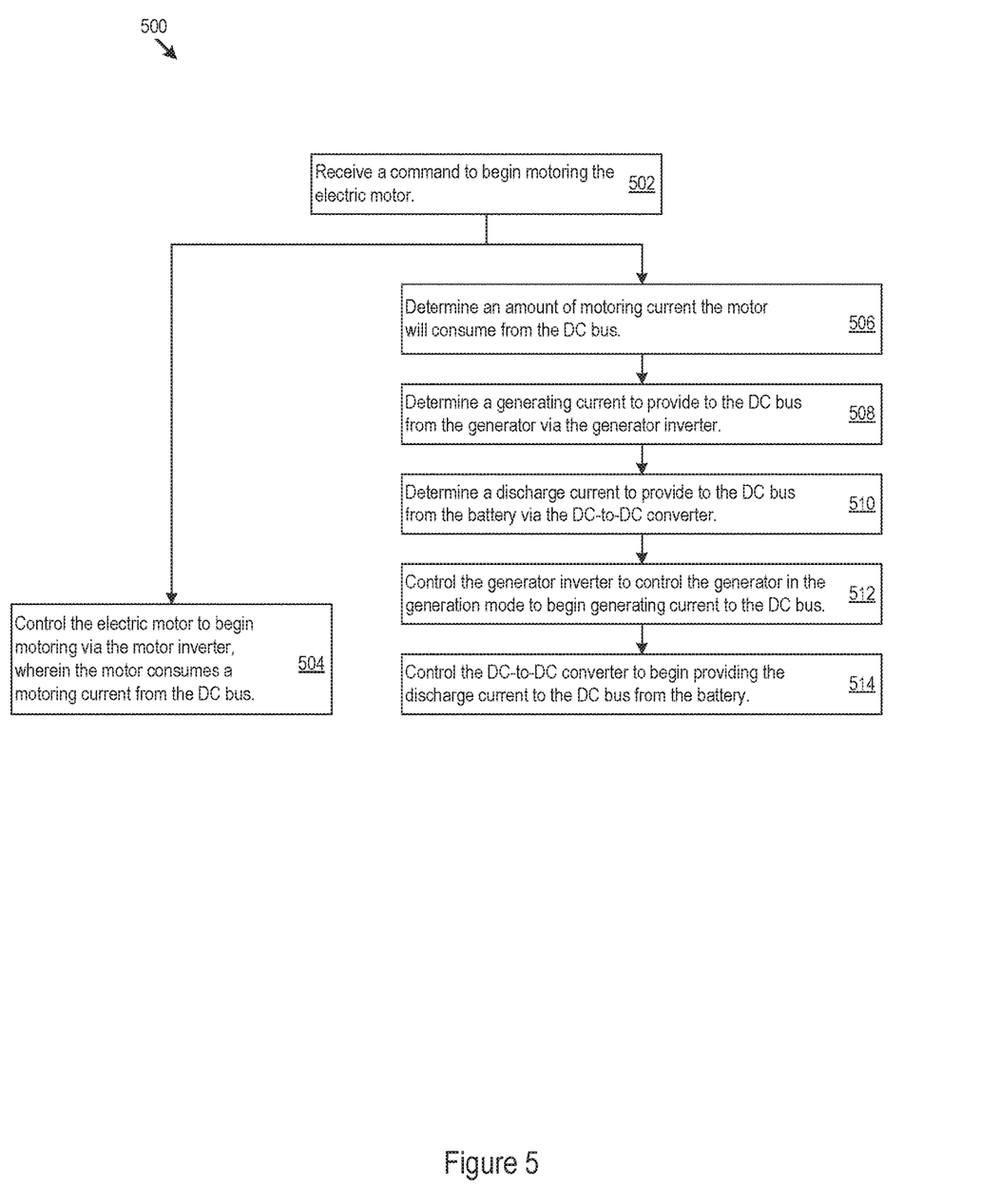
FIG. 5 shows another example flow diagram of logic that the improved power system architecture of FIG. 2 may implement in accordance with various embodiments.

FIG. 5 shows another example flow diagram of a method 500 the improved power system architecture of FIG. 2, and particularly the VPM circuitry 210, may implement in accordance with various embodiments. Whereas the method 400 of FIG. 4 involves sinking braking current generated by the motor 104 to the generator 102 and the battery 128, method 500 involves providing motoring current to the motor 104 from the generator 102 and the battery 128. At 502, the VPM circuitry 210 receives a command from the TCU 120 to begin motoring (e.g., accelerating) the electric motor 104. At 504, responsive to receiving the motoring command, the VPM circuitry 210 begins controlling the electric motor in the motoring mode, via the motor inverter 206, to begin motoring (e.g., accelerating). As a result, the motor 104 consumes a motoring current from the DC bus 106 via the motor inverter 206.

At 506, also responsive to receiving the command to begin motoring the electric motor 104 (step 502), the VPM circuitry 210 determines (e.g., predicts, estimates, anticipates, calculates, or measures) an amount of motoring current the motor 104 will consume from the DC bus 106 via the motor inverter 206. With this information, at 508, the VPM circuitry 210 determines (e.g., predicts, estimates, anticipates, calculates, or measures) a generating current or power to provide to the DC bus 106 from the generator 102 via the generator inverter 204. Similarly, at 510, the VPM circuitry 210 determines a discharge current to provide to the DC bus 106 from the battery 128 via the DC-to-DC converter 208. In one approach, the VPM circuitry 210 determines the generating current and the battery discharge current such that their sum are substantially equal to the motoring current provided to the motor 104. At 512, the VPM circuitry 210 begins controlling the generator inverter 204 to control the generator 102 in the generation mode to begin providing the generating current to the DC bus 106. Similarly, at 514, the VPM circuitry 210 begins controlling the DC-to-DC converter 208 to begin providing the battery discharge current to the DC bus 106 from the battery 128.

In certain approaches, the VPM circuitry 210 begins and/or completes steps 506, 508, and 510 prior to or simultaneously with the motor inverter 206 beginning to motor the motor 104 and beginning to consume the motoring current from the DC bus 106 (step 504). Also, the VPM circuitry 210 begins steps 512 and 514 prior to or simultaneously with the motor inverter 206 beginning to consume the motoring current from the DC bus 106 (step 504). In this arrangement, the VPM circuitry 210 provides feedforward determinations of an amount of current to be provided by each of the generator 102 and the battery 128, and subsequently controls the generator inverter 204 and the DC-to-DC converter 208 according to those determinations, which reduces or prevents low transients on the DC bus 106 caused by the rapid removal of current to the motor 104 during motoring or acceleration. Because the battery 128 and the DC-to-DC converter 208 can quickly transfer power to the DC bus 106 (e.g., quicker than the generator 102 and engine 112 can react), and because there is substantially no communication delay between the VPM circuitry 210 and the DC-to-DC converter 208, the battery 128 and the DC-to-DC converter 208 can react quickly to provide the necessary current to avoid drops in DC bus voltage while allowing the motor 104 (and any other loads) to consume all the current that is needed. In such an arrangement, peak load shaving can be avoided and overall vehicle dynamics and responsiveness are improved.

In some embodiments, the DC-to-DC converter 208 may be configured to operate in either a continuous conduction mode (CCM) or a discontinuous conduction mode (DCM), depending on the current conducted through the DC-to-DC converter 208. For example, when the DC-to-DC converter 208 conducts lighter current loads (e.g., below 87.5 Amps) to or from the battery 128, the DC-to-DC converter 208 may operate in the DCM mode (e.g., by utilizing DCM control algorithms). Conversely, with larger current loads, the DC-to-DC converter 208 may operate in the CCM mode (e.g., by utilizing CCM control algorithms, which are different from the DCM control algorithms). DCM control algorithms generally provide more accurate control over the current output of the DC-to-DC converter 208, but are typically only usable with lighter current loads. The VPM circuitry 210, and particularly a DC-to-DC converter controller module of the VPM circuitry 210, may switch operation of the DC-to-DC converter 208 between the CCM and DCM modes depending on the current load. However, the VPM circuitry 210 must handle the transitions between the two modes accurately or the DC-to-DC converter may become unstable. To better anticipate changes between CCM and DCM modes, the VPM circuitry 210 can utilize the feedforward information regarding the operational demands on the DC-to-DC converter 208 (e.g., the need to either store or provide current) so that it can determine which operation mode will be required, and if a transition between modes is required, simultaneous with or even before the actual need for the operation mode transition arises. Because the VPM circuitry 210 utilizes this feedforward information, as opposed to feedback information, the VPM circuitry 210 can better handle any operation mode transitions in real time to avoid creating instability with the DC-to-DC converter 208.

Although the embodiments above discuss control of both the generator inverter 204 and the DC-to-DC converter 208 to sink or provide current on the DC bus 106 at the same time to handle transients caused by quick load changes, in some embodiments or instances, the VPM circuitry 210 may control only one of the generator inverter 204 or the DC-to-DC converter 208 in a prioritized manner to handle the transients. For example, in one approach, if the motor 104 will quickly require current, the VPM circuitry 210 can control the DC-to-DC converter 208 to provide that current from the battery quickly, possibly without affecting the generator 102 and generator inverter 204, at least initially. For example, if the voltage of the DC bus drops below a threshold (e.g., 670 volts), then the VPM circuitry 210 may then engage the generator inverter 204 to begin operating the generator 102 in generation mode to provide additional current. In another approach, if the motor 104 will begin braking and inputting current onto the DC bus 106, the VPM circuitry 210 may analyze the current mechanical loads 116 and may first use that incoming current to motor the generator 102 to provide power to those mechanical loads 116 rather than saving the power in the battery. Many variations and priority hierarchies are possible. However, persons having skill in the art will understand that the improved power system architecture 200 is capable of sinking power from and providing power to the DC bus 106 via both of the DC-to-DC converter 208 and the generator inverter 204 simultaneously and according to the above-described feedforward methodology. Additionally, although the system primarily uses the new feedforward approach to current management, a typical feedback system can still be employed, for example, as a backup to ensure the DC bus 106 maintains a nominal voltage within a set range.

Figure 6:
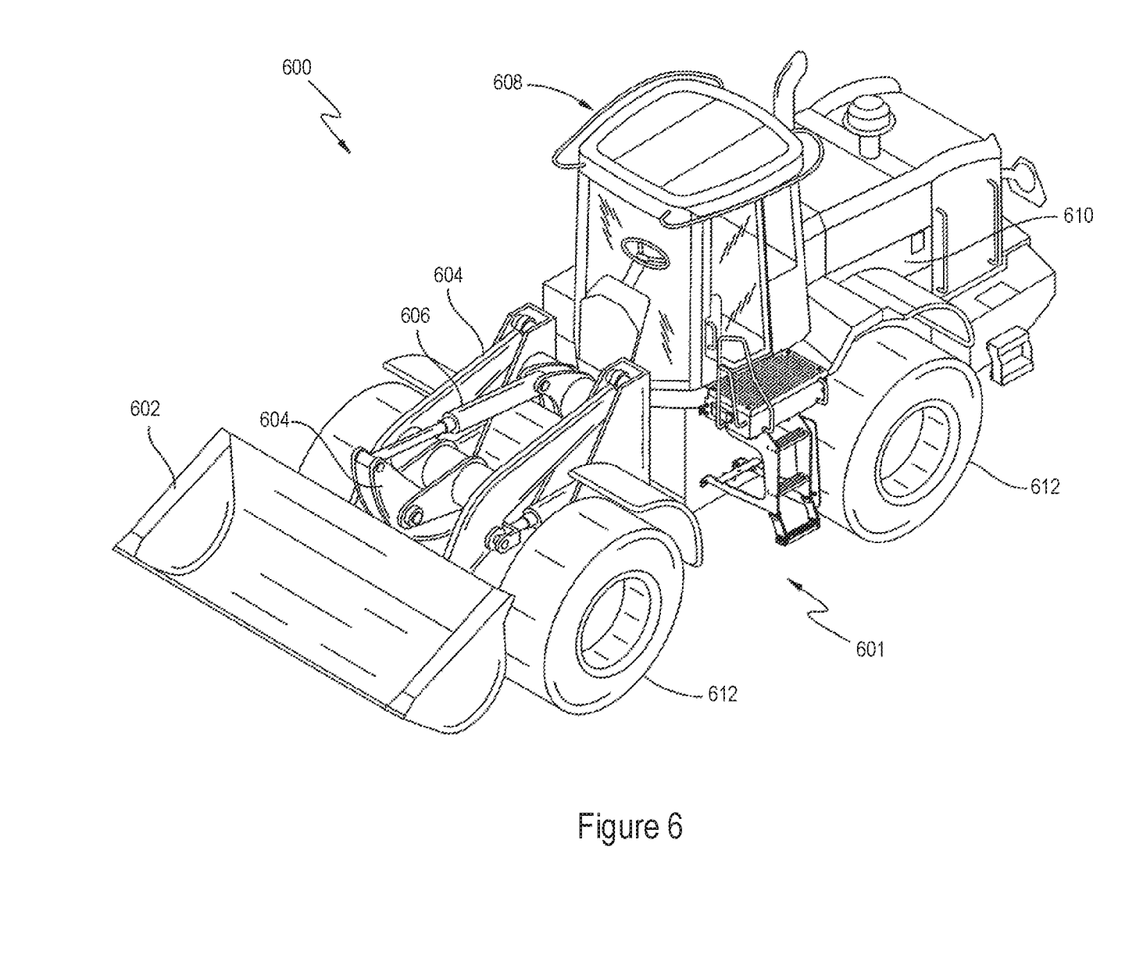
FIG. 6 shows an example hybrid electric vehicle or machine comprising a loader in accordance with various embodiments.

FIG. 6 illustrates an example hybrid electric vehicle 600 that may utilize the improved power system architecture 200 in accordance with various embodiments. The hybrid electric vehicle 600 may be a work vehicle (e.g., for construction, forestry, agriculture, or turf) or any other type of vehicle utilizing an electric power system. By way of example, as is shown in FIG. 6, the hybrid electric vehicle 600 may be a loader 601 including a bucket 602 on a front end for digging and dumping material, bucket supports 604 and hydraulics 606 for supporting and moving the bucket 602, an operator's cabin 608, and an engine compartment 610 in the rear. The loader 601 may include wheels 612 and/or a continuous or caterpillar track and may utilize four-wheel drive to move the loader 600.

In one embodiment, the improved power system architecture is well suited to provide a feedforward control scheme with improved response time to accommodate power transients on the DC bus during vehicle braking, vehicle acceleration, and other vehicle functions. For example, in certain embodiments, because the vehicle power management circuitry knows how it is controlling the motor (e.g., to brake the motor), it can determine, predict, or measure an anticipated, expected, or actual amount of current that will be or is presently being injected onto the DC bus ahead or time or in real-time with the actual generation of that current. In one approach, such predictions can be based on a lookup table (or other data structures) that takes into account the power, torque, or speed of the motor or generator, as well as the known efficiency of the system or conversion process, which lookup table may be populated with empirical, historical, and/or continuously updated observed or studied acceleration and braking processes for typical operation of the vehicle. Thus, prior to or simultaneously with the actual generation of that current on the DC bus, the vehicle power management circuitry can utilize this feedforward information to determine currents to provide to the generator and/or the battery to accommodate the influx of power generated during braking prior to the influx of current actually occurring. In this manner, the improved power system architecture is capable of capturing, storing, and/or utilizing substantially all power transients on the DC bus caused during braking of the electric motor via the currents provided to the generator (i.e., by motoring the generator to provide power to other mechanical loads) and/or provided to the battery via the DC-to-DC converter. Thus, vehicle efficiency is greatly improved due to ability to store and reuse substantially all power generated during the entirety of a braking operation.

Because all of the current generated on the DC bus during the entire braking process is provided to the generator and/or the battery, the improved power system architecture may also eliminate the brake resistor and associated cooling system, which reduces weight, cost, and complexity of the hybrid electric vehicle and improves overall efficiency. Similarly, because the vehicle power management circuitry can operate quickly to control the DC bus voltage via the generator and/or the battery, the improved power system architecture may also utilize a smaller DC bus capacitor (or bank of capacitors), which also reduces weight and cost of the hybrid electric vehicle.

In one approach, a set of transistors of the single power control unit that were previously used to provide current to the brake resistor (e.g., a brake chopper circuit) in the traditional power system architecture is repurposed to operate as part of the DC-to-DC converter. Because the DC-to-DC converter is collocated with the motor inverter and the generator inverter within the single power control unit, the improved power system architecture eliminates an entire separate DC-to-DC converter module, thereby reducing cost, weight, and complexity of the hybrid electric vehicle. Similarly, the improved power system architecture eliminates an external DC bus filter previously required between the inverters and the DC-to-DC converters. With the traditional power system architecture, the DC bus filter is required to filter harmonic oscillations that may develop on the DC bus due to the fact that the inverters and the DC-to-DC converter are in separate modules and controlled subject to communications delay. Because the inverters and the DC-to-DC converter are all collocated within the single power control unit and controlled by the same vehicle power management circuitry, the DC bus filter is no longer required.

Because the vehicle power management circuitry can control the inverters and DC-to-DC converter with minimal or essentially no delay, the improved power system architecture can quickly provide power when needed and where needed (e.g., during accelerating or lifting a load with a bucket) with little to no delay. This improves the vehicle dynamics (e.g., acceleration, braking, or lifting). Similarly, this also reduces peak shaving requirements within the entire power system. Peak shaving is the reduction of instantaneous power usage by one system (e.g., mechanical loads such as hydraulic lifting) in favor of another system (e.g., motoring by the electric motor) due to prioritization of the various systems' power usage. For example, if the hybrid electric vehicle is accelerating by motoring the electric motor while simultaneously lifting a heavy load via hydraulics, traditional power system architectures may utilize peak shaving to reduce the instantaneous power available to either the motor or the hydraulics to avoid overloading the power system and dropping the DC bus voltage. However, because the improved power system architecture can respond more quickly to instantaneous power needs, power can be provided quickly to whatever load requires it without introducing transients on the DC bus.

Similarly still, the internal combustion engine size can be reduced while maintaining power outputs and vehicle dynamics. With traditional power system architectures, the engine (which drives the generator) is sized to accommodate the largest instantaneous loads via mechanical force. However, the improved power system architecture greatly reduces or eliminates the delay of power provided to the DC bus from the battery such that battery power can be utilized more efficiently and quickly within the system rather than engine power. As such, the size of the engine can be reduced, while peak shaving requirements can be reduced, thereby also improving vehicle dynamics even with a reduced engine size. The reduced engine size reduces the cost and weight of the hybrid electric vehicle, as well as reduces fuel usage and cost and improves overall vehicle efficiency. Additionally still, the vehicle can be operated in a battery-only mode where the engine can be turned off and certain loads (even motoring loads) can be powered by the battery. This reduces fuel usage and costs as well as engine idle hours. Similarly, the vehicle can be operated at a constant fuel consumption level or below a certain fuel consumption maximum level by utilizing battery power when loading on the system would otherwise increase the fuel consumption level. Because the system knows the engine load level, knows the current fuel consumption, and can estimate the future fuel consumption (e.g., when the engine is loaded without using the battery), the system can likewise maintain fuel consumption at or below the current fuel consumption level by supplementing engine power with battery power. This also reduces fuel usage and costs.

So configured, the improved power system architecture 200 provides technical performance that improve the function and efficiency of the hybrid electric vehicle. For example, communication and control is much quicker, which allows for feedforward control mechanisms. This improves the efficiency of the system by enabling the capture and reuse of excess power developed in the system throughout entire braking actions without dissipating current in a brake resistor. Additionally, weight, cost, and complexity of the vehicle are reduced by eliminating the brake resistor (126), eliminating a separate DC-to-DC converter (130), eliminating a DC bus filter (146), and reducing the size of the DC bus capacitor (309). Further, vehicle dynamics and responsiveness are improved and peak load shaving is reduced.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. One skilled in the art will realize that a virtually unlimited number of variations to the above descriptions are possible, and that the examples and the accompanying figures are merely to illustrate one or more examples of implementations. It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Various implementations have been specifically described. However, many other implementations are also possible.

What is claimed is:

1. A hybrid electric vehicle power system comprising:
a power control unit comprising:
a direct current (DC) bus;
a first power inverter electrically coupled to the DC bus and configured to control an electric motor in a motoring mode and a braking mode, and configured to provide current to the electric motor from the DC bus when in the motoring mode and to input current from the electric motor to the DC bus when in the braking mode;
a second power inverter electrically coupled to the DC bus and configured to control a generator in a generating mode and a motoring mode, and configured to provide current to the generator from the DC bus when in the motoring mode and to input current from the generator to the DC bus when in the generating mode;
a bi-directional DC-to-DC converter electrically coupled to the DC bus and configured to electrically couple to a battery and configured to provide current to and receive current from the battery and to convert voltage between the DC bus at a first voltage and the battery at a second voltage; and
vehicle power management circuitry configured to:
receive a command to begin braking the electric motor;
control the electric motor in the braking mode, via the first power inverter, to begin braking, wherein the first power inverter inputs a braking current generated by the electric motor onto the DC bus;
responsive to receiving the command to begin braking the electric motor, and at least one of prior to or simultaneously with the first power inverter beginning to input the braking current on the DC bus:
determine or estimate an amount of braking current the first power inverter will input on the DC bus;
determine or estimate a first motoring current to provide to the generator from the DC bus via the second power inverter; and
determine a charging current to provide to the battery from the DC bus via the DC-to-DC converter.

2. The hybrid electric vehicle power system of claim 1 wherein the vehicle power management circuitry is further configured to:
at least one of prior to or simultaneously with the first power inverter beginning to input the braking current on the DC bus:
control the second power inverter to begin providing the first motoring current to the generator; and
control the DC-to-DC converter to begin providing the charging current to the battery.

3. The hybrid electric vehicle power system of claim 1 wherein the power control unit is configured to remove a maximum amount of braking current that the first power inverter can input to the DC bus via substantially only the first motoring current to the generator and the charging current to the battery.

4. The hybrid electric vehicle power system of claim 3 wherein the power control unit is configured to accept the maximum amount of braking current that the first power inverter can input to the DC bus while maintaining a voltage of the DC bus below an over-voltage trip voltage.

5. The hybrid electric vehicle power system of claim 1 wherein the power control unit is configured to remove a maximum amount of braking current that the first power inverter can input to the DC bus without using a brake chopper resistor.

6. The hybrid electric vehicle power system of claim 1 wherein the vehicle power management circuitry controls the first power inverter, the second power inverter, and the bi-directional DC-to-DC converter via direct connection without communicating via an intermediary communication format communicated external to the power control unit.

7. The hybrid electric vehicle power system of claim 1 wherein the bi-directional DC-to-DC converter is directly connected to the DC bus internal to the power control unit without using an external DC bus filter.

8. The hybrid electric vehicle power system of claim 1 wherein the DC-to-DC converter further comprises a switch having a switched voltage output and a DC-to-DC filter external to the power control unit and electrically coupled between the switched voltage output and the battery.

9. The hybrid electric vehicle power system of claim 1 wherein the vehicle power management circuitry is further configured to:
receive a command to begin motoring the electric motor;
control the electric motor, via the first power inverter, to begin motoring, wherein the first power inverter consumes a second motoring current from the DC bus;
at least one of prior to or simultaneously with the first power inverter beginning to consume the second motoring current from the DC bus, and responsive to receiving the command to begin motoring the electric motor:
determine an amount of the second motoring current the first power inverter will consume from the DC bus; and
determine a generating current to provide to the DC bus from the generator; and
determine a discharge current to provide to the DC bus from the battery;
and
at least one of prior to or simultaneously with the first power inverter beginning to consume the second motoring current from the DC bus:
control the second power inverter to begin providing the generating current to the DC bus from the generator; and
control the DC-to-DC converter to begin providing the discharge current to the DC bus from the battery.

10. A method of operating a hybrid electric vehicle power system, the method comprising:
receiving, by vehicle power management circuitry of a power control unit, a command to begin braking an electric motor electrically coupled to a first power inverter of the power control unit;

controlling the electric motor, via the first power inverter, to begin braking, wherein the first power inverter inputs a braking current onto a DC bus of the power control unit generated by the electric motor;

responsive to receiving the command to begin braking the electric motor, and at least one of prior to or simultaneously with the first power inverter beginning to input the braking current on the DC bus:
- determining, by the vehicle power management circuitry, an amount of the braking current the first power inverter will input on the DC bus from the electric motor;
- determining, by the vehicle power management circuitry, a first motoring current to provide to a generator from the DC bus via a second power inverter of the power control unit; and
- determining, by the vehicle power management circuitry, a charging current to provide to a battery from the DC bus via a DC-to-DC converter of the power control unit;

and at least one of prior to or simultaneously with the first power inverter beginning to input the braking current on the DC bus:
- controlling the second power inverter to begin providing the first motoring current to the generator; and
- controlling the DC-to-DC converter to begin providing the charging current to the battery.

11. The method of claim 10, wherein the braking current includes a maximum amount of braking current that the first power inverter can input to the DC bus, the method further comprising determining the first motoring current and the charging current such that a sum of the first motoring current and the charging current is substantially equal to the braking current throughout an entire duration of a braking action.

12. The method of claim 10, further comprising controlling the second power inverter and the DC-to-DC converter to remove a maximum amount of braking current that the first power inverter can input to the DC bus throughout an entire duration of a braking action.

13. The method of claim 12, further comprising removing the maximum amount of braking current that the first power inverter can input to the DC bus while maintaining a voltage of the DC bus below an over-voltage trip voltage.

14. The method of claim 10, further comprising removing a maximum amount of braking current that the first power inverter can input to the DC bus throughout an entire duration of a braking action via the second power inverter and the DC-to-DC converter without using a brake chopper resistor.

15. The method of claim 10, further comprising:
controlling, with the vehicle power management circuitry, the first power inverter, the second power inverter, and the DC-to-DC converter via direct connection without communicating via an intermediary communication format communicated external to the power control unit.

16. The method of claim 10, further comprising:
receiving, by the vehicle power management circuitry, a command to begin motoring the electric motor;
controlling the electric motor, via the first power inverter, to begin motoring and consuming a second motoring current from the DC bus;
responsive to receiving the command to begin motoring the electric motor, and at least one of prior to or simultaneously with controlling the electric motor to begin to consume the second motoring current from the DC bus:
- determining, by the vehicle power management circuitry, an amount of the second motoring current the motor will consume from the DC bus;
- determining, by the vehicle power management circuitry, a generating current to provide to the DC bus from the generator via the second power inverter; and
- determining, by the vehicle power management circuitry, a discharge current to provide to the DC bus from the battery via the DC-to-DC converter; and at least one of prior to or simultaneously with the electric motor beginning to consume the second motoring current from the DC bus:
- controlling the second power inverter to begin providing the generating current to the DC bus from the generator; and
- controlling the DC-to-DC converter to begin providing the discharge current to the DC bus from the battery.

17. A method comprising:
controlling, by vehicle power management circuitry of a power control unit, a first power inverter of the power control unit to begin braking an electric motor coupled to the first power inverter, wherein the first power inverter inputs a braking current onto a DC bus of the power control unit from the electric motor;
at least one of prior to or simultaneously with the first power inverter beginning to input the braking current on the DC bus:
- determining, by the vehicle power management circuit, an amount of the braking current the first power inverter will input on the DC bus from the electric motor;
- determining, by the vehicle power management circuit, a motoring current to provide to a generator from the DC bus via a second power inverter of the power control unit; and
- determining, by the vehicle power management circuit, a charging current to provide to a battery from the DC bus via a DC-to-DC converter of the power control unit;

and controlling, with the vehicle power management circuitry, the first power inverter, the second power inverter, and the DC-to-DC converter via direct connection without communicating via an intermediary communication format communicated external to the power control unit.

18. The method of claim 17, further comprising:
at least one of prior to or simultaneously with the first power inverter beginning to input the braking current on the DC bus:
- controlling the second power inverter to begin providing the motoring current to the generator; and
- controlling the DC-to-DC converter to begin providing the charging current to the battery.

19. The method of claim 17, further comprising accepting a maximum amount of braking current that the first power inverter can input to the DC bus throughout an entire duration of a braking action via the second power inverter and the DC-to-DC converter without using a brake chopper resistor.

20. The method of claim 17, wherein the braking current is a maximum amount of braking current that the first power inverter can input to the DC bus, and wherein the method further comprises determining the motoring current and the charging current such that a sum of the motoring current and the charging current is substantially equal to the braking current throughout an entire duration of a braking action.

* * * * *